United States Patent [19]

Sanderford

[11] Patent Number: 5,147,595
[45] Date of Patent: Sep. 15, 1992

[54] APPARATUS AND METHOD FOR REDUCING PLASTIC FILM NECK-IN

[75] Inventor: Bruce Sanderford, Dublin, Calif.

[73] Assignee: James River II, Inc., Oakland, Calif.

[21] Appl. No.: 734,555

[22] Filed: Jul. 23, 1991

[51] Int. Cl.⁵ ............................................. B29C 41/52
[52] U.S. Cl. ...................................... 264/555; 264/556; 264/571; 264/216; 425/72.1; 425/224; 425/388; 425/326.1; 425/387.1
[58] Field of Search ............ 264/556, 571, 555, 290.2, 264/216; 425/72.1, 66, 377, 224, 388, 387.1, 326.1

[56] References Cited

U.S. PATENT DOCUMENTS

| 2,736,056 | 2/1956 | Toulmin, Jr. | 425/377 |
|---|---|---|---|
| 3,444,585 | 5/1969 | Watanabe | 264/290.2 |
| 3,597,515 | 8/1971 | Widiger | 264/556 |
| 4,017,575 | 4/1977 | Heyer | 264/556 |
| 4,505,657 | 3/1985 | Ikeya | 425/72.1 |
| 4,728,277 | 3/1988 | Planeta | 425/72.1 |
| 5,030,409 | 7/1991 | Hisanaga et al. | 264/556 |

FOREIGN PATENT DOCUMENTS

| 50-1896 | 1/1975 | Japan | 264/556 |
|---|---|---|---|
| 50-25509 | 8/1975 | Japan | 264/216 |
| 894147 | 4/1962 | United Kingdom | 425/72.1 |

Primary Examiner—Jeffery Thurlow
Attorney, Agent, or Firm—Thomas R. Lampe

[57] ABSTRACT

Apparatus for stabilizing and reducing neck-in and edge thickness of a hot-plastic web including a pair of nozzle assemblies located at spaced edges of the web. Each nozzle assembly includes a pair of elongated nozzle elements which direct a pair of gaseous flows along opposed sides of the web transverse to the direction of movement of the web and toward an edge thereof.

11 Claims, 2 Drawing Sheets

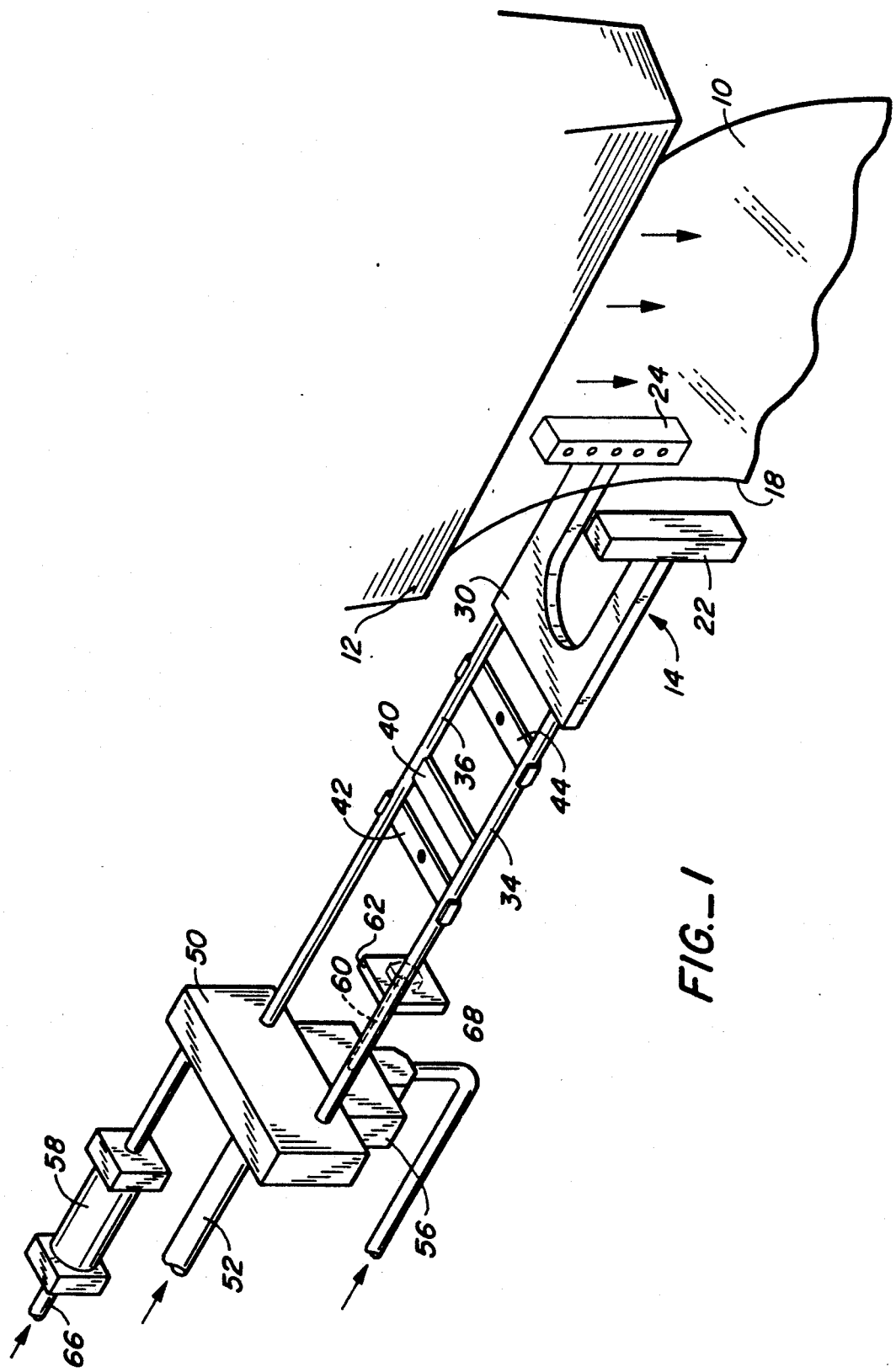
FIG._1

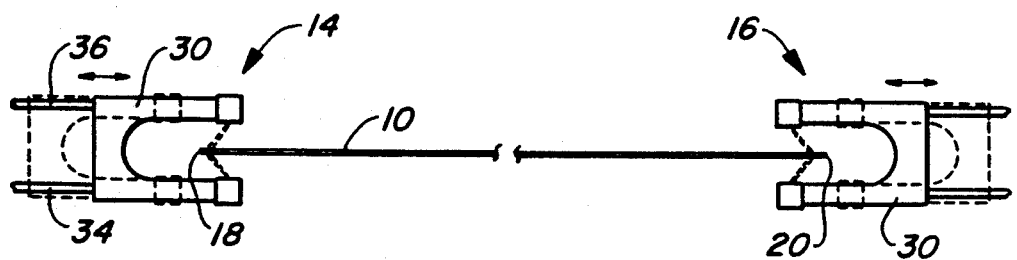
FIG._2
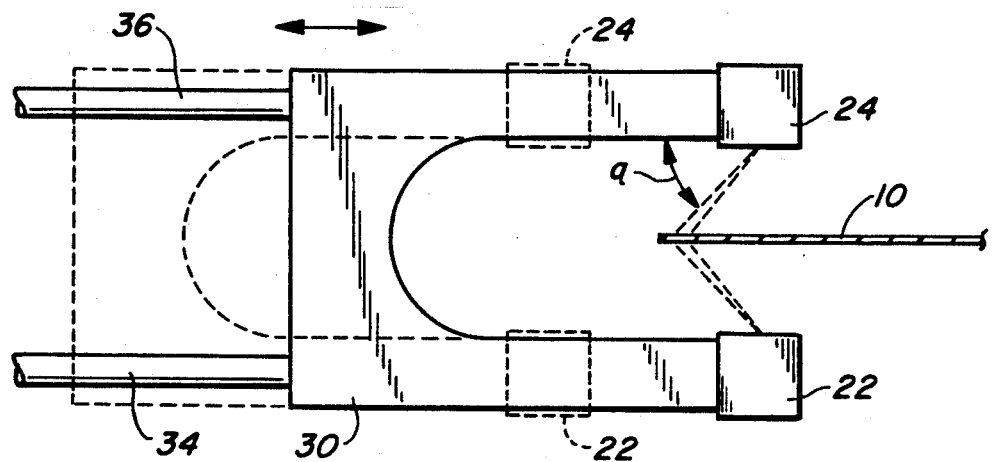
FIG._3
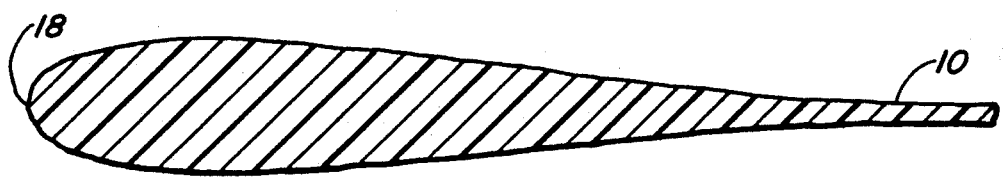
FIG._4
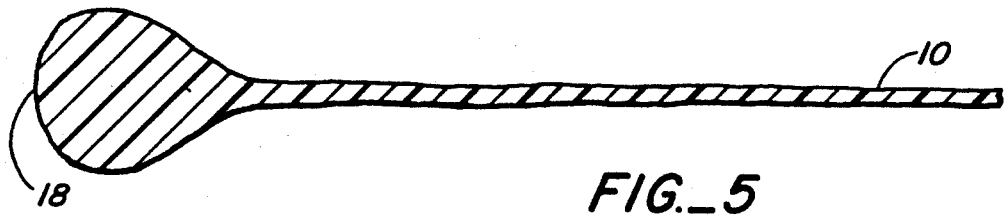
FIG._5

APPARATUS AND METHOD FOR REDUCING PLASTIC FILM NECK-IN

TECHNICAL FIELD

This invention relates to the manufacture of plastic film. More particularly, the invention is directed to a system which will stabilize and reduce neck-in and edge thickness of a hot plastic web.

BACKGROUND ART

It is known in the plastic film industry to blow compressed air adjacent to the edges of a hot film web to "fix" or pin the web at the edges in an attempt to reduce neck-in thereof. For example, Japanese Pat. No. 57-43816, dated Mar. 12, 1982, discloses the use of air nozzles located at two positions in the air gap range between a T-die and press roll to blow compressed air onto both ends of film extruded from the T-die. After the ends are fixed by the blown air the film is bonded onto a substrate by means of a press roll and cooling roll. The patent indicates that the amount of neck-in of the extruded film may be reduced.

*Nylon Plastics*, a book published by John Wylie & Sons, Inc. (1973), on page 250 thereof, discloses the use of copper tubing jets to prevent edge weaving and excessive neck-in of nylon film prior to contact with a chill roll.

The above-described arrangements would appear to be relatively ineffective insofar as attaining their desired results are concerned. In particular, each of the devices disclosed in the prior art incorporates nozzles which direct rather localized jets onto the surface of the moving film. Thus, puncture of the film or other damage thereto may result from the air jets exiting from the nozzles, particularly at the high air velocities which may be required to attain the desired objectives. In addition, there is no teaching in the prior art of any significant degree of entrainment of ambient air through use of these devices which target rather localized spots on the web.

DISCLOSURE OF INVENTION

The present invention, in common with the above-described prior art arrangements, utilizes an air flow to impact upon a moving plastic web to "fix" same and reduce neck-in of the film web. However, in contrast to such prior art devices, the present apparatus is so constructed that it directs an air flow against the moving web along a substantial distance thereof. Also, the apparatus of the present invention is so constructed as to utilize ambient air flow to stabilize the web and reduce neck-in and edge thickness thereof while the web is hot. Utilizing the present system curtains of air are formed on opposed sides and at opposed edges of the film. A Venturi effect is generated to increase efficiency of the apparatus in accomplishing its functions of neck-in reduction, web stabilization, and edge bead minimization, as compared to the prior art arrangements noted above.

The apparatus of the present invention includes a first nozzle assembly located adjacent to a first edge of a hot plastic web for directing a first pair of gaseous flows along opposed first portions of the web planar sides adjacent to the first edge transverse to the direction of movement of the web and toward the first edge.

The first pair of gaseous flows extend along a substantial, predetermined length of the opposed first portions. Each of the first pair of gaseous flows includes a primary gaseous flow component exiting from the first nozzle assembly and a secondary gaseous flow component comprised of ambient air entrained by the primary gaseous flow component exiting from the first nozzle assembly.

A second nozzle assembly is located adjacent to a second edge of the hot plastic web for directing a second pair of gaseous flows along opposed second portions of the web planar sides adjacent to the second edge transverse to the direction of movement of the web and toward the second edge.

The second pair of gaseous flows extend along a substantial, predetermined length of the opposed second portions and each of the second pair of gaseous flows includes a primary gaseous flow component exiting from the second nozzle assembly and a secondary gaseous flow component comprised of ambient air entrained by the primary gaseous component exiting from the second nozzle assembly.

Each of the nozzle assemblies includes a pair of elongated nozzle elements. Each of the nozzle elements defines at least one aperture for directing the primary gaseous flow component toward a web portion along the substantial predetermined length thereof. Each of the nozzle elements defines a restricted fluid flow path with the web whereby the Venturi effect is generated with respect to at least the second gaseous flow components.

The method of the present invention is for the purpose of stabilizing and reducing neck-in and edge thickness of a hot plastic web having opposed planar sides and first and second edges.

The method includes a step of moving the web in a predetermined direction of movement. During the web movement, a first pair of gaseous flows are directed along opposed first portions of the web planar sides adjacent to the first edge transverse to the direction of movement of the web and toward the first edge. The first pair of gaseous flows extend along a substantial, predetermined length of the opposed first portions.

Simultaneously with the step of directing the first pair of gaseous flows, a second pair of gaseous flows are directed along opposed second portions of the web planar sides adjacent to the second edge transverse to the direction of movement of the web and toward the second edge. The second pair of gaseous flows extend along a substantial, predetermined length of the opposed second portions.

Opposed tensional forces are exerted on the web by the first and second pair of gaseous flows to stabilize and hold the web and reduce web neck-in.

Each of the gaseous flows are formed by forcing air through at least one restricted opening to create a primary gaseous component and entraining ambient air therewith after passage through at least one restricted opening. The method includes a step of passing at least the secondary gaseous flow component through a restricted fluid flow path to generate the Venturi effect with respect thereto.

Other features, advantages, and objects of the present invention will become apparent with reference to the following description and accompanying drawings.

BRIEF DESCRIPTION OF DRAWINGS

FIG. 1 is a perspective, somewhat diagrammatic view of a nozzle assembly and related structure constructed in accordance with the teachings of the present invention disposed at one edge of a web exiting a die;

FIG. 2 is a plan, diagrammatic view illustrating two nozzle assemblies disposed at opposed edges of a web;

FIG. 3 is an enlarged plan view illustrating alternative positions assumable by a nozzle assembly;

FIG. 4 is a greatly enlarged, sectional view illustrating in highly exaggerated fashion an edge portion of a web prior to treatment by the apparatus and method of the present invention; and FIG. 5 is a view similar to FIG. 4 but illustrating an edge portion of a web subsequent to treatment by the apparatus and method of the present invention.

BEST MODE FOR CARRYING OUT THE INVENTION

Referring now to the drawings, a web of hot plastic 10 is shown exiting from a die 12 (FIG. 1). Web or curtain 10 may, for example, be a polymer sheet. The principles of the present invention, however, have application to any type of plastic web including webs of single layer or multi-laminate construction.

Immediately upon exit from the lips of a die, a hot plastic web or curtain will tend to neck-in, that is, the web will immediately begin to diminish in width due to a number of physical factors. Neck-in of a web not only results in variances in web width but also an increase in width thickness at the edges thereof. It may be necessary to cut these extended, thick edges from the web, resulting in inefficiency and waste. Furthermore, the web when in unsupported condition between the die and the next stage of the operation may wave or wobble, which action, if extreme, can result in web damage as well as disruption of the manufacturing process.

According to the teachings of the present invention, nozzle assemblies 14, 16 (FIG. 2) are disposed, respectively, at first and second edges 18, 20 of the plastic web 10 below die 12. The nozzle assemblies are mirror images thereof and identical in construction. For this reason, in the interest of brevity and simplicity, only one of the nozzle assemblies, nozzle assembly 14, will be described in detail.

Nozzle assembly 14 includes pair of elongated nozzle elements 22, 24, said elements being elongated in the direction of movement of the web 10. In the arrangement illustrated, nozzle elements 22, 24 have formed therein a plurality of apertures 26 spaced from on another and disposed substantially along the length of the nozzle element. The nozzle elements 22, 24, when in operative position, are located adjacent first edge 18 alongside the planar sides of the web and the apertures 26 are so positioned and oriented that they direct a pair of gaseous flows along opposed first portions of the web planar sides adjacent to the first edge transverse to the direction of movement of the web and toward the first edge. This is shown by dash lines in FIGS. 2 and 3.

The pair of gaseous flows created by the nozzle elements extend along a substantial, predetermined length of the opposed portions of the plastic web adjacent to first edge 18. For example, a suitable length for most applications has been found to be within the range ⅜ in. to 3 in.

The air emitted from the nozzle elements 22, 24 impacts upon the web 10 at an acute angle α. It has been found that 45 degrees is a suitable angle.

Each of the pair of gaseous flows created by nozzle elements 22, 24 include a primary gaseous flow component which exits directly from the nozzle elements and a secondary gaseous flow component comprised of ambient air entrained by the primary gaseous flow component exiting from the nozzles. This secondary gaseous flow component passes through a restricted fluid flow path defined by each nozzle and the web whereby the Venturi effect is generated with respect to the secondary gaseous flow component. This feature results in an efficient and effective utilization of compressed air passing through the nozzle elements. The Venturi effect as applied to both of the gaseous flows also results in a highly stable moving web. Furthermore, the combination of primary and secondary gaseous flow components results in substantial uniform engagement of moving air with the web to exert a strong uniform endwise pull thereon along a significant length of the web.

The interiors of the elongated nozzle elements 22, 24 are, of course, hollow and such interiors communicate with the hollow interior of a fork-like support 30.

Conduits 34, 36 extend from support 30, the support 30 providing fluid flow communication through suitable channels (not shown) formed therein between conduits 34, 36 and nozzle elements 22, 24. In the arrangement illustrated, a brace 40 extends between the conduits and cooperates therewith to form a relatively rigid structure. The conduits 34, 36 are in slidable engagement with and supported by guide elements 42, 44. The guide elements themselves are preferably mounted upon a suitable framework (not illustrated) fixed relative to the die.

Conduits 34, 36 extend and are affixed to a manifold 50. Tubing 52 also communicates with the manifold and extends to a suitable source of air pressure (not shown). Extending below manifold 50 and affixed thereto is an air cylinder mounting block 56 having an air cylinder 58 attached thereto. The movable arm 60 of the air cylinder projects through a throughbore formed in the mounting block 56 and extends to framework or other structure positioned relative to the die, for example the deckle, the distal end of the arm 60 being affixed thereto by means of an attachment plate 62 secured by suitable fasteners.

Conduits 66, 68 are in operative association with the air cylinder and in selective communication with a suitable source of pressurized air. Pressurization of conduit 66 will serve to extend the arm 60 while pressurization of conduit 68 will serve to retract the arm. Thus, nozzle assembly 14 can be moved into operative association wherein the nozzle elements 22, 24 have the web 10 disposed therebetween or to an inoperative position wherein the nozzle elements are removed from the web and spaced outwardly from edge 18. Of course, adjustment to a desired intermediate position may be had also.

Insofar as placement of the nozzle elements relative to the web and die is concerned, a suitable location for a nozzle element has been found to be about one-half inch below the die lip with the nozzle apertures 26 about one and one-half inches into the web flow stream when the nozzle elements are in operative position. The precise air pressure employed with respect to the nozzle elements will vary somewhat depending upon the nature of the web with which they are utilized. The air pressure, for example, may fall within a range of from about 3 PSI to 10 PSI, with the air pressure adjusted by the operator through a suitable valve mechanism to a point where maximum pullout of the web edge is attained.

A suitable aperture size has been found to be 0.02 in. with the apertures 26 being separated from one another by0 .25 in. These dimensions are representative only and may be varied dependant upon the exigencies of the situation.

FIGS. 4 and 5, respectively, show in highly exaggerated fashion a web edge which has been untreated by the present system and a web edge which has been so treated. It will be noted that the bead at the edge of the treated edge is much more localized. To remove the bead of the treated web, much less web need be trimmed away.

I claim:

1. Apparatus for stabilizing and reducing neck-in and edge thickness of a hot plastic web having opposed, unsupported planar sides and first and second edges, said web moving in a predetermined direction of movement, said apparatus comprising:

a first nozzle assembly including a pair of first nozzle elements, said first nozzle elements being located adjacent to said first edge inwardly of said first edge with said first nozzle elements in opposition to each other and positioned on opposite sides of said web adjacent said opposed, unsupported planar sides, said first nozzle assembly for directing a first pair of gaseous flows along opposed first portions of said unsupported web planar sides adjacent to said first edge transverse to the direction of movement of said web and toward said first edge, said first pair of gaseous flows extending along a substantial, predetermined length of said opposed first portions and each of said first pair of gaseous flows including a primary gaseous flow component exiting from said first nozzle assembly and a secondary gaseous flow component comprised of ambient air entrained by the primary gaseous flow component exiting from said first nozzle assembly, each of said first nozzle elements defining at least one aperture for directing said primary gaseous flow component toward a first web portion along said substantial predetermined length thereof and at an acute angle thereto, and each of said first nozzle elements defining a restricted fluid flow path with said web whereby the Venturi effect is generated with respect to at least said secondary gaseous flow components; and a second nozzle assembly spaced from said first nozzle assembly including a pair of second nozzle elements, said second nozzle elements being located adjacent to said second edge inwardly of said second edge with said second nozzle elements in opposition to each other and positioned on opposite sides of said web adjacent said opposed, unsupported planar sides, said second nozzle assembly for directing a second pair of gaseous flows along opposed second portions of said unsupported web planar sides adjacent to said second edge transverse to the direction of movement of said web and toward said second edge, said second pair of gaseous flows extending along a substantial, predetermined length of said opposed second portions and each of said second pair of gaseous flows including a primary gaseous flow component exiting from said second nozzle assembly and a secondary gaseous flow component comprised of ambient air entrained by the primary gaseous component exiting from said second nozzle assembly, each of said second nozzle elements defining at least one aperture for directing said primary gaseous flow component toward a second web portion along said substantial predetermined length thereof and at an acute angle thereto, and each of said second nozzle elements defining a restricted fluid flow path with said web whereby the Venturi effect is generated with respect to at least said secondary gaseous flow components.

2. The apparatus according to claim 1 wherein each of said nozzle elements is elongated and defines a plurality of spaced apertures generally aligned in the direction of web movement, the end-most of said plurality of apertures being spaced apart a distance generally corresponding to said predetermined length.

3. The apparatus according to claim 1 wherein said acute angle is in the order of forty-five degrees.

4. The apparatus according to claim 1 wherein each of said nozzle assemblies additionally comprises conduit means connected to said nozzle elements for supplying compressed gas to said nozzle elements.

5. The apparatus according to claim 1 additionally comprising means for selectively moving said nozzle assemblies toward and away from said plastic web.

6. The apparatus according to claim 4 wherein said conduit means includes a plurality of conduits and a manifold connected to said conduits at a location spaced from said nozzle elements.

7. The apparatus according to claim 6 additionally comprising support means for supporting said conduits and said nozzle elements, said conduits and said nozzle elements being slidably movable relative to said support means for movement toward and away from said web.

8. The apparatus according to claim 1 wherein the nozzle elements of each nozzle assembly are spaced from each other and so positioned that the primary gaseous flow components exiting therefrom move along converging flow paths and impact said web passing therebetween at diametric locations on the opposed planar sides of said web to stabilize and hold said web while exerting end-wise tensional forces on said web to reduce neck-in thereof.

9. A method of stabilizing and reducing neck-in and edge thickness of a hot plastic web having opposed planar sides and first and second edges, said method comprising the steps of:

moving said web in a predetermined direction of movement with the opposed planar sides thereof unsupported;

during said web movement, directing a first pair of gaseous flows along opposed first portions of said unsupported web planar sides adjacent to said first edge transverse to the direction of movement of said web and toward said first edge, said first pair of gaseous flows extending along a substantial, predetermined length of said opposed first portions;

simultaneously with said step of directing said first pair of gaseous flows, directing a second pair of gaseous flows along opposed second portions of said unsupported web planar sides adjacent to said second edge transverse to the direction of movement of said web and toward said second edge, said second pair of gaseous flows extending along a substantial, predetermined length of said opposed second portions;

forming each of said gaseous flows by forcing air through at least one restricted opening to create a primary gaseous component and entraining ambient air therewith after passage through said at least one restricted opening to provide a secondary gaseous component;

passing at least the secondary gaseous flow component through a restricted fluid flow path to generate the Venturi effect with respect thereto; and exerting opposed tensional forces on said web by said first and second pair of gaseous flows to stabilize and hold said web and reduce web neck-in by directing the primary flow components of each pair of gaseous flows along converging flow paths and intercepting the primary flow component by said web at diametric locations on the opposed, unsupported planar sides of the web closely adjacent to said edges.

10. The method according to claim 9 wherein the air forced through said at least one restricted opening is directed toward a web portion at an acute angle thereto.

11. The method according to claim 10 wherein said acute angle is in the order of forty-five degrees.

* * * * *